E. A. PRIDMORE AND W. W. MILLER.
MOLDING MACHINE.
APPLICATION FILED SEPT. 19, 1914.

1,309,336.

Patented July 8, 1919.
8 SHEETS—SHEET 1.

Witnesses:
Inventors:
Edward A. Pridmore
William W. Miller,
By Dyrenforth, Lee, Chritton and Wiles
Attys.

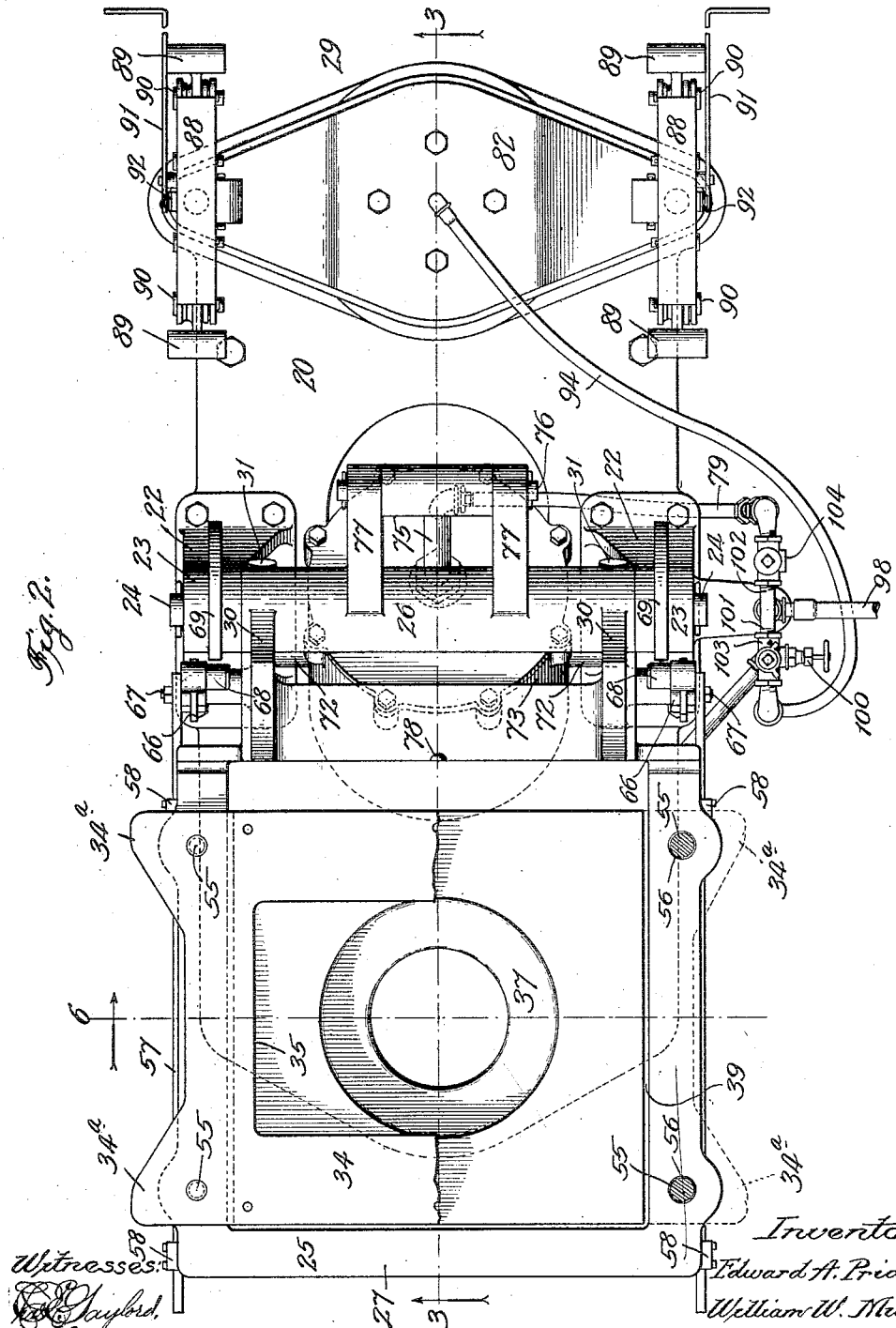

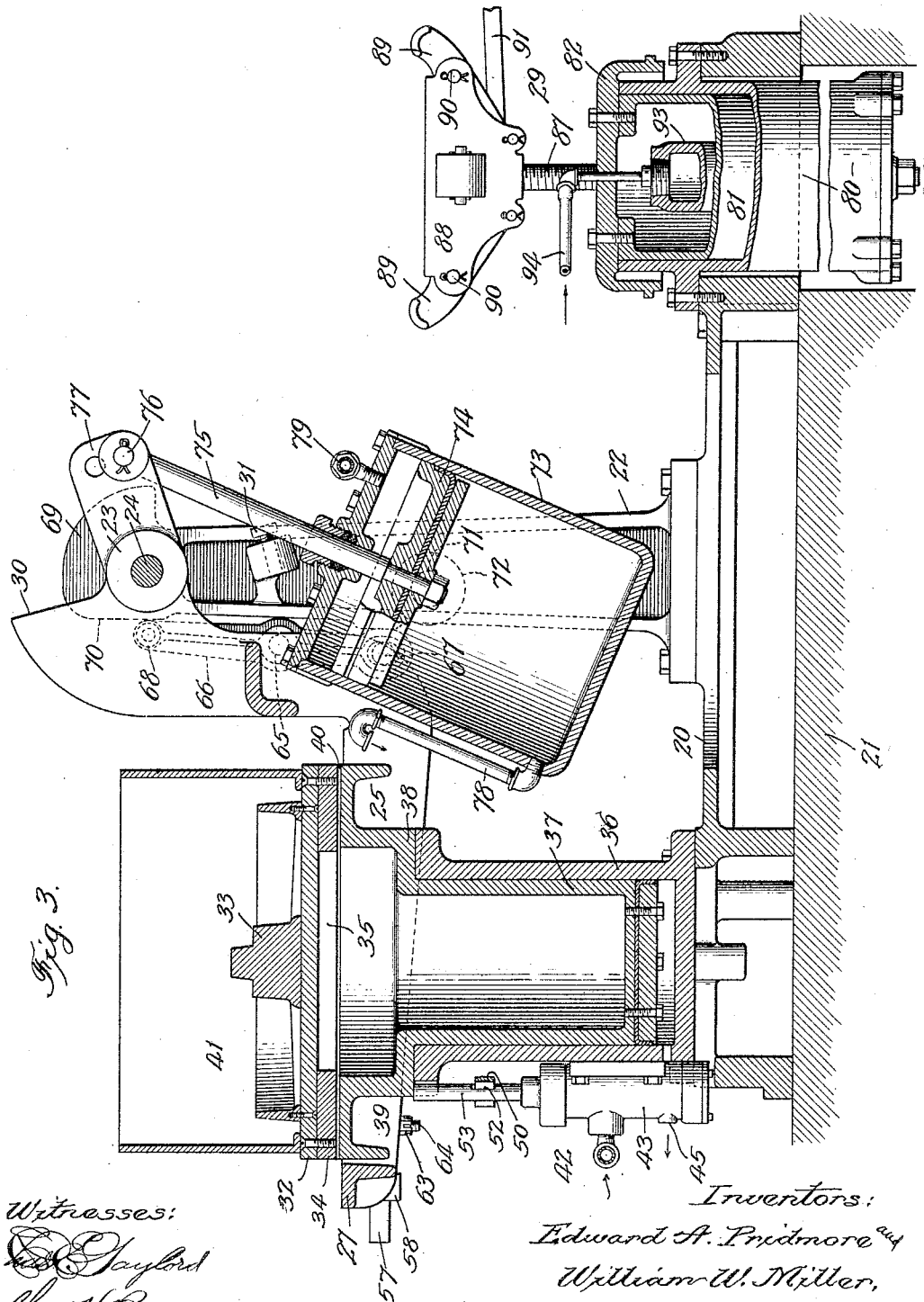

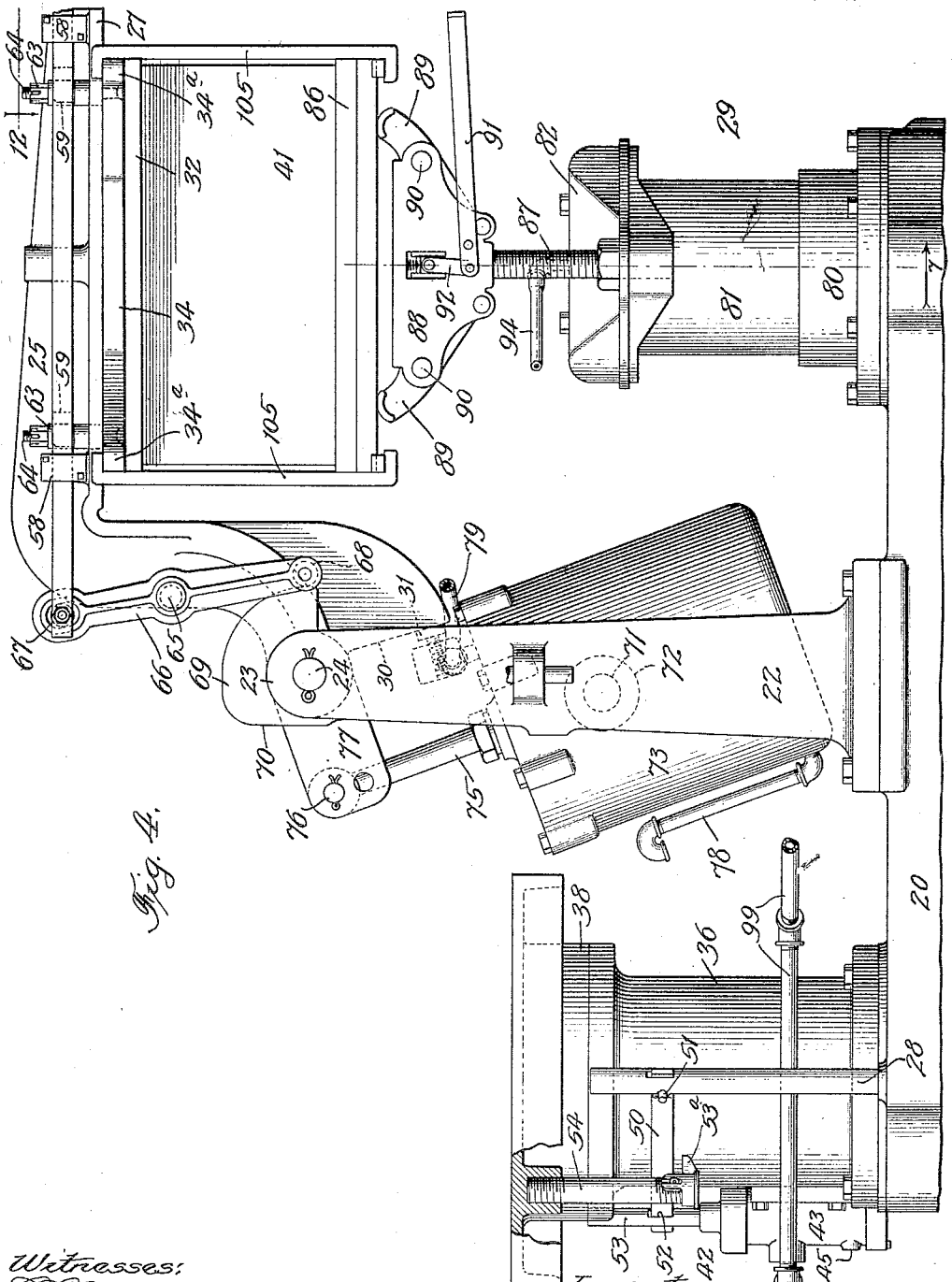

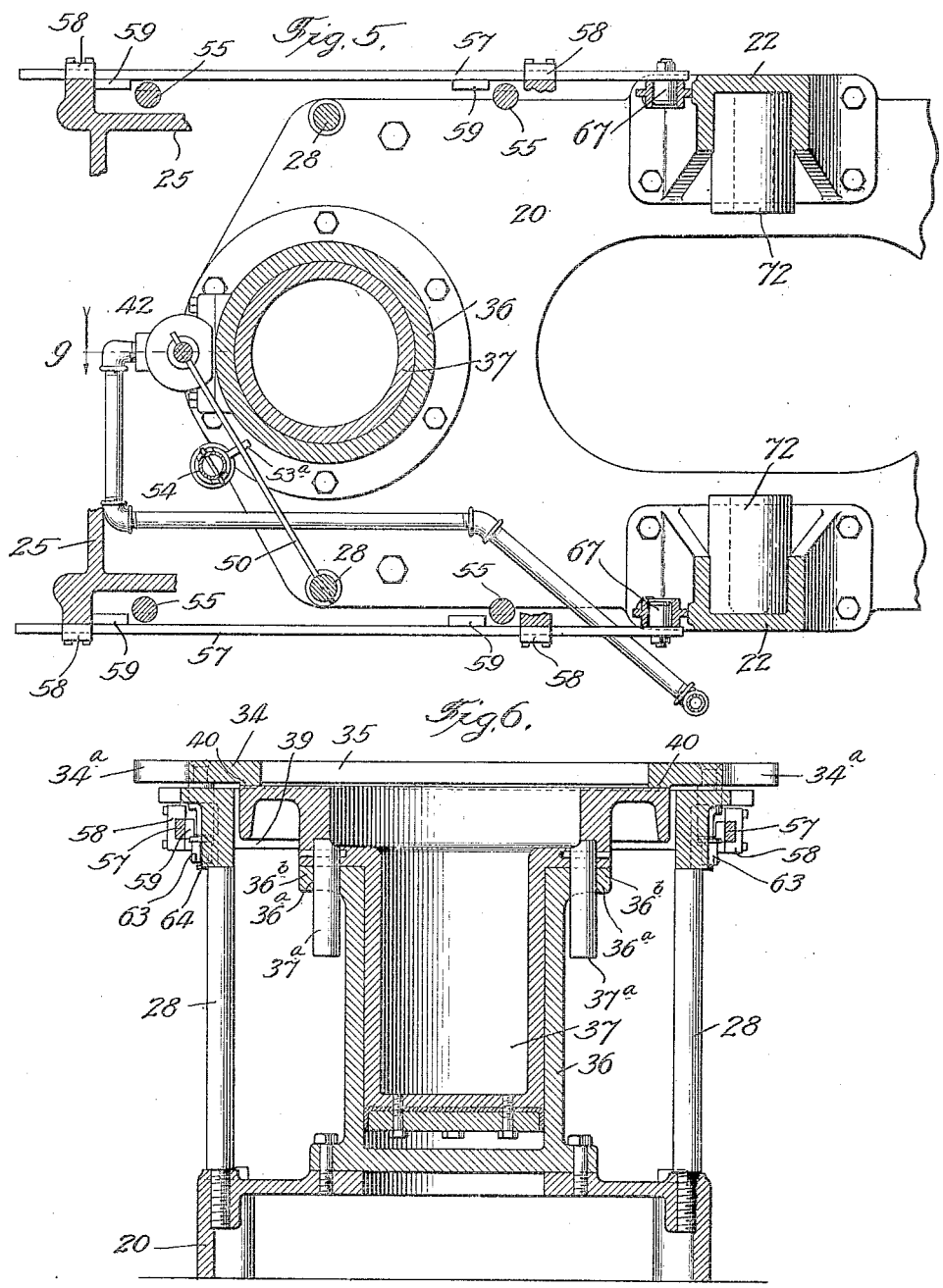

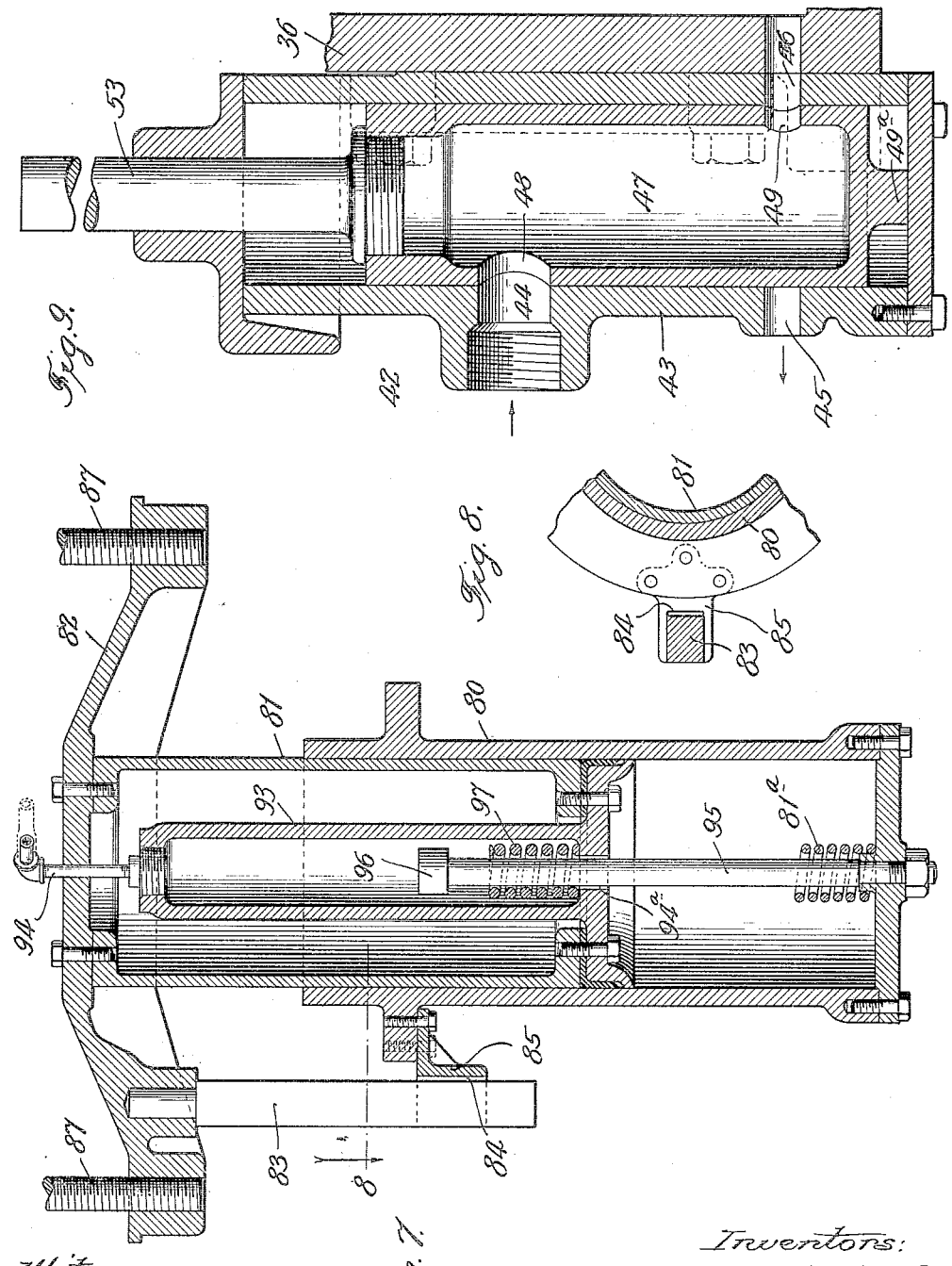

E. A. PRIDMORE AND W. W. MILLER.
MOLDING MACHINE.
APPLICATION FILED SEPT. 19, 1914.

1,309,336.

Patented July 8, 1919.
8 SHEETS—SHEET 7.

E. A. PRIDMORE AND W. W. MILLER.
MOLDING MACHINE.
APPLICATION FILED SEPT. 19, 1914.
1,309,336.
Patented July 8, 1919.
8 SHEETS—SHEET 8.
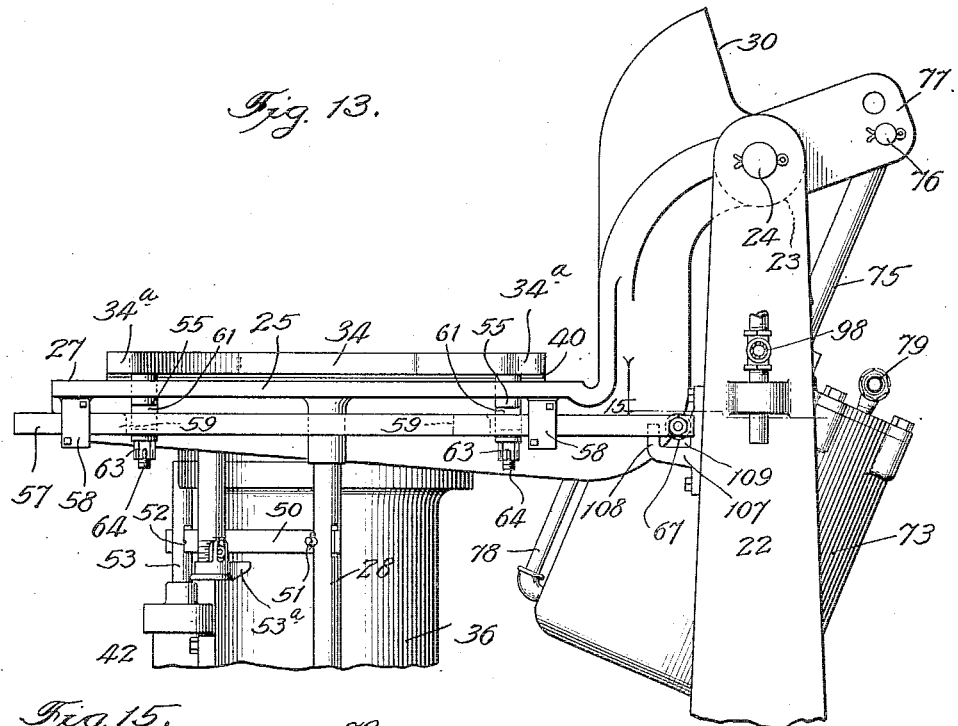
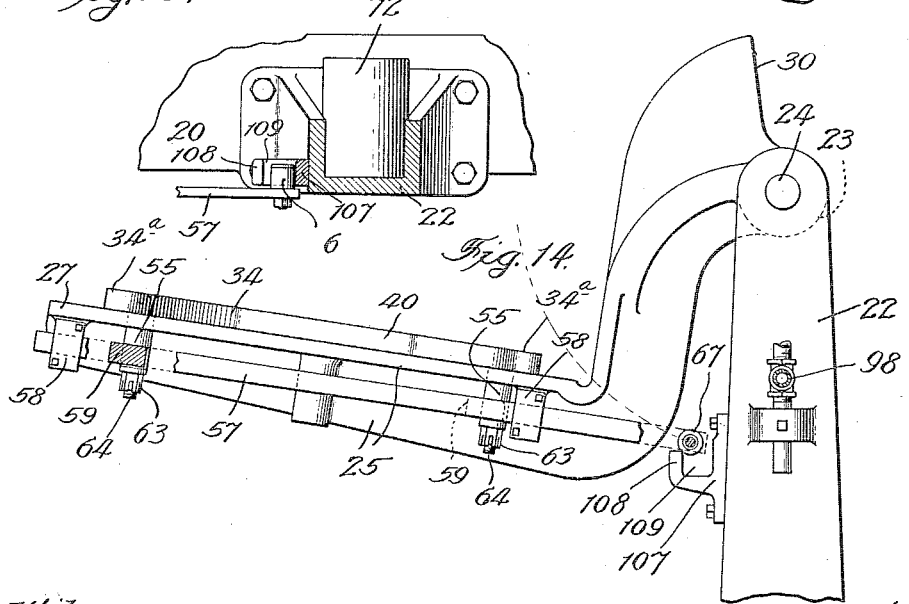

UNITED STATES PATENT OFFICE.

EDWARD A. PRIDMORE AND WILLIAM W. MILLER, OF LA GRANGE, ILLINOIS.

MOLDING-MACHINE.

1,309,336.  Specification of Letters Patent.  Patented July 8, 1919.

Application filed September 19, 1914.  Serial No. 862,449.

*To all whom it may concern:*

Be it known that we, EDWARD A. PRIDMORE and WILLIAM W. MILLER, citizens of the United States, residing at La Grange, in the county of Cook and State of Illinois, have invented a new and useful Improvement in Molding-Machines, of which the following is a specification.

Our invention relates to molding machines of the type involving a pattern-carrier mounted to be turned from one position in which the mold is rammed, into a position in which the mold is separated from the pattern.

Our primary objects are to improve molding machines of this general type to the end of rendering them more efficient for performing the work for which they are provided, for rendering them more particularly adapted for operating on heavy pieces of work with a view to reduce the amount of labor required on the part of the operator; and more particularly to provide in a machine of the character above stated, and as a part thereof, means whereby the mold may be jarred to compact the sand therein, and thereby reducing the amount of handling of the mold during its production, and other objects as will appear from the following specification.

We have devised our improvements for use more particularly in a machine of the type commonly termed a marginally hinged machine, and have therefore illustrated it in the accompanying drawings in this type of construction, though not with the idea of limiting our invention thereby.

Referring to the accompanying drawings:

Fig. 2 is a plan-view of the machine illustrated in Fig. 1.

Figure 1:
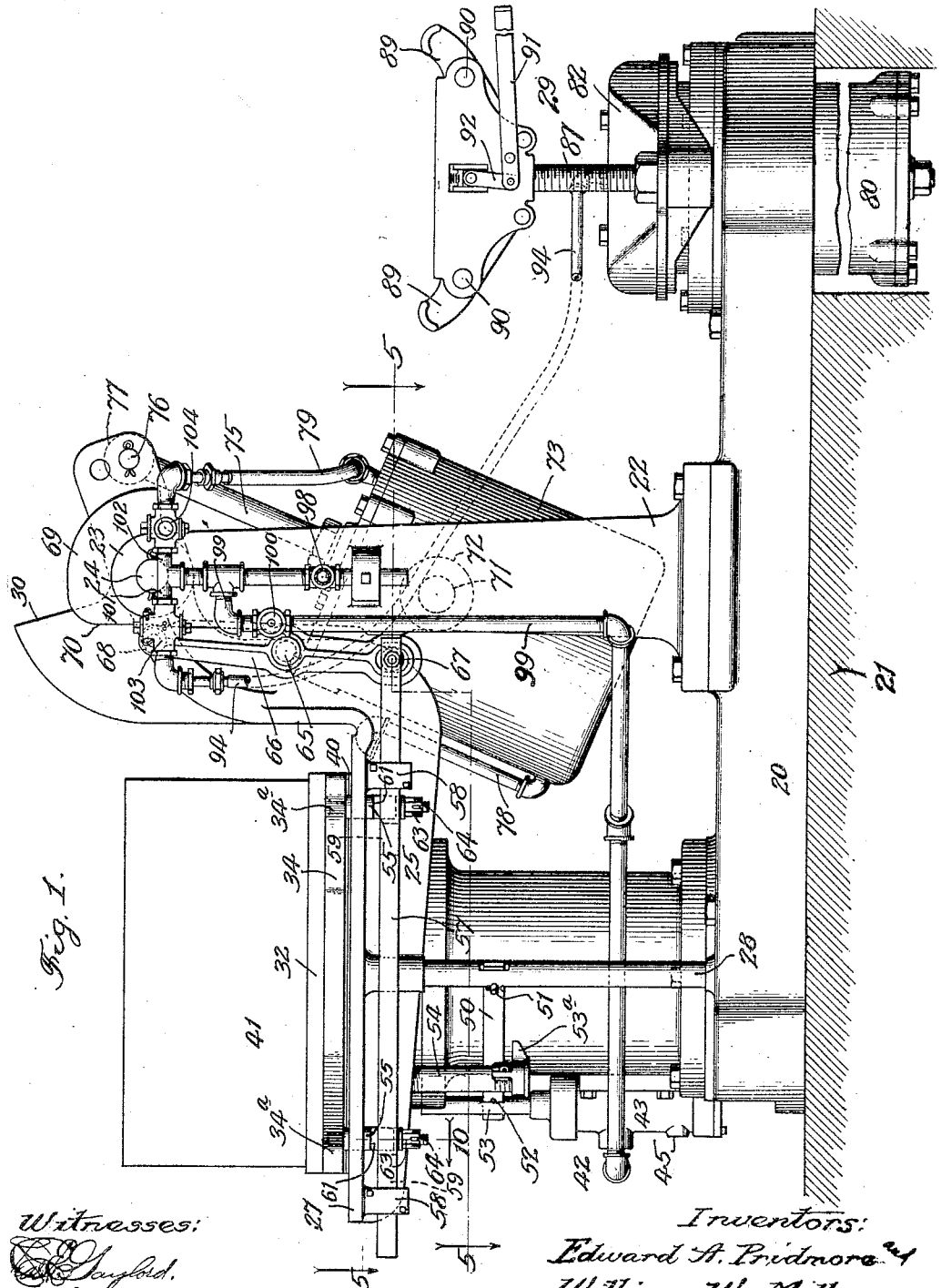
Figure 1 is a view in side elevation of a machine of the marginally hinged type constructed in accordance with our invention.
Figure 10:
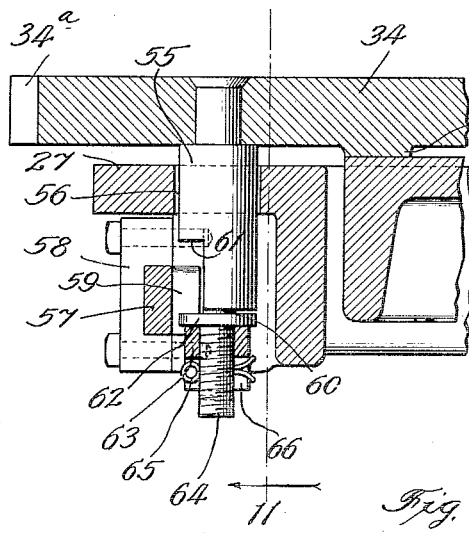
Figure 11:
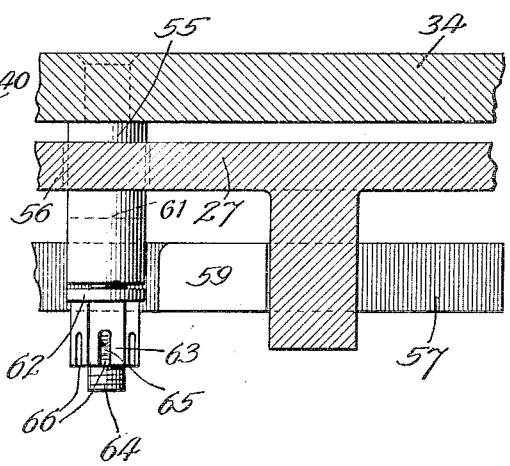
Figure 12:
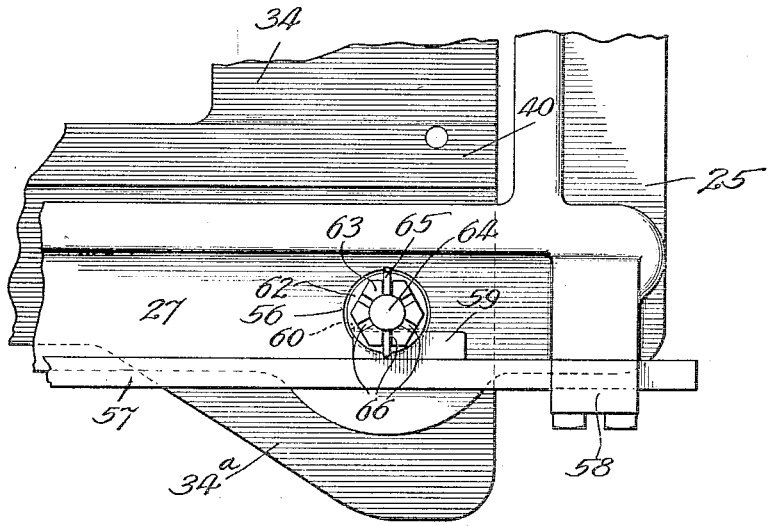

Fig. 3 is a view in vertical sectional elevation of the machine illustrated in Fig. 1, the section being taken at the line 3 on Fig. 2 and viewed in the direction of the arrow; the foregoing figures showing the machine in the position assumed by its parts when the carrier is in ramming position. Fig. 4 is a view like Fig. 1, showing the parts of the machine in the positions they assume upon inverting the carrier to pattern-drawing position, but before the pattern-drawing operation has begun. Fig. 5 is a section taken in two different horizontal planes on the lines 5 in Fig. 1, and viewed in the direction of the arrows, the outer portions of the machine shown in this figure being taken at the uppermost line 5. Fig. 6 is a section taken at the line 6 on Fig. 2, and viewed in the direction of the arrow. Fig. 7 is an enlarged section taken at the line 7 on Fig. 4, and viewed in the direction of the arrow, this view showing certain details of the actuating mechanism for the flask-receiving device at the "drawing" side of the machine. Fig. 8 is a broken section taken at the line 8 on Fig. 7, and viewed in the direction of the arrow. Fig. 9 is an enlarged section taken at the line 9 on Fig. 5, and viewed in the direction of the arrow, this view showing certain details of the valve mechanism for controlling the admission of fluid pressure to, and the exhaust of the same from, the cylinder forming a part of the jarring mechanism. Fig. 10 is a broken enlarged section taken at the line 10 on Fig. 1, and viewed in the direction of the arrow. Fig. 11 is a similar section taken at the line 11 on Fig. 10, and viewed in the direction of the arrow. Fig. 12 is a plan-view of a portion of the pattern-carrier, this view being taken at the line 12 on Fig. 4, and viewed in the direction of the arrow; the last three referred to figures showing certain details of the automatically operating mechanism provided for the purpose of releasedly locking the pattern-plate to the pattern-carrier after the jarring operation has been completed. Fig. 13 is a view like Fig. 1 with certain of the parts therein shown, omitted, this view showing a modification of the automatically operating mechanism for locking the pattern-plate to the carrier. Fig. 14 is a view like Fig. 13, of the parts therein shown, this view showing the positions assumed by the parts of the locking mechanism after the pattern carrier has finished its initial turning movement to invert the mold, the locking means being shown in locked condition; and Fig. 15, an enlarged broken section taken at the line 15 on Fig. 13, and viewed in the direction of the arrow.

In the particular construction illustrated, the machine is formed of a bed-plate 20 adapted to be securely anchored in a foundation, as, for example, the cement foundation represented at 21. Bolted to and rising from this bed-plate at its opposite sides and at points intermediate its ends, are standards 22 spaced apart as represented, the upper ends of these standards being provided with bearings 23 in which a shaft 24 extending transversely of the bed-plate 20 is journaled. The shaft 24 forms a pivotal support for the pattern-carrier, represented at 25, this carrier being connected at a sleeve-section 26 thereon with the shaft 24, the sleeve-section being located at a margin of the carrier and offset relative to the portion thereof, represented at 27, on which the pattern-plate and flask is carried.

In one position of the machine, namely the ramming position, the pattern-carrier 25 is designed to be supported in such position that the portion 27 thereof will be substantially horizontal, and this is accomplished in the particular construction of machine illustrated by providing at opposite sides of the bed-plate 20 upright posts 28 upon the tops of which the carrier rests when swung to the position above stated, namely, that illustrated in Fig. 1.

At the side of the machine, opposite to that at which the ramming of the flask takes place, means are provided for separating the flask and mold from the pattern, this being accomplished by holding the pattern-carrier, after inverting it from the position it occupies during the ramming operation, at right angles to the path of movement of vertically movable flask-receiving mechanism represented at 29, and hereinafter more fully described, the position of the pattern-carrier relative to the flask-receiving mechanism, as above stated, being effected by means of projections 30 on the pattern-carrier which abut against the adjustable stop-devices 31 provided on the standards 22.

A pattern-plate is represented at 32, this plate carrying the pattern such as that represented at 33, and being connected with a plate 34 provided centrally with an opening 35.

As above stated, the machine is adapted to jar the mold before completing the mold-forming operation and before inversion of the pattern-carrier preparatory to the pattern-drawing operation, and to this end we provide jarring mechanism, a description of which is as follows:

Secured to the base-plate 20 at the ramming side of the machine, is an upright cylinder 36 containing a piston 37 having an offset section 38 at its upper end at which the piston is adapted to rest upon the upper end of the cylinder 36, and carrying guide-pins 37$^a$ sliding in openings 36$^a$ in flanges 36$^b$ on the cylinder 36. The piston 37 extends through an opening 39 in the portion 27 of the pattern-carrier 25, the plate 34 resting at ribs 40 on its under side, upon the top of the piston 37. The piston 37 is reciprocated up and down in the cylinder 36, to jar the mold which is made in the flask represented at 41, the piston 37 being lifted by air pressure and allowed to drop by gravity, the shoulder 38 on the piston striking the top of the cylinder 36 and thereby causing the sand in the flask 41 to become thoroughly compacted about the pattern 33, this operation of the piston 37, in the particular construction of machine illustrated being accomplished by means of air pressure supplied through the valve mechanism represented at 42 and involving a valve-casing 43 containing an inlet port 44 adapted to be connected with a supply, not shown, of compressed air, an exhaust port 45 and a third port 46 which opens into the lower end of the cylinder 36; a hollow valve member 47 reciprocable in the casing 43 and containing a port 48 adapted to be moved into and out of registration with the port 44, and a port 49 adapted to be moved into and out of registration with the port 46 and registering with the latter when the port 48 registers with the port 44, the bottom of said valve being provided with a centrally disposed lug 49$^a$ and the ports 45 and 46 being so disposed relative to the lower end of the valve 47 that when the latter is raised, as hereinafter described, the ports 45 and 46 will communicate with each other through the medium of the interior of the cylinder 43. When the valve 47 is in the position illustrated in Fig. 9 air will flow from the port 44 through the valve 47, port 49 and port 46 into the bottom of the cylinder 36, thus forcing the piston 37 upwardly, and when the piston valve 47 is raised to its uppermost position, it will close the cylinder 36 to the supply of compressed air and open it to the exhaust 45, thus permitting the piston 37 to fall by gravity and reduce the jarring action above referred to. To produce in an automatic manner, the shifting of the valve 47 for the purpose stated, we provide a bar 50 pivoted, as indicated at 51, to one of the standards 48 and extending at its free end through a slot 52 in the stem 53 of the valve 47, this bar extending into the path of movement of a projection 53$^a$ provided on the lower end of a depending member 54 secured to the enlarged portion 38 of the piston 37 whereby as the piston 37 nears the limit of its upward movement the projection 53$^a$, by engaging the under side of the bar 50, lifts the latter and thereby lifts the valve 47 to a position in which the supply of air to the cylinder 36 is cut off and the latter is opened to the exhaust 45. The upper end of the valve stem 53 extends into the path of downward movement of the piston 37, whereby as this piston nears the limit of its downward stroke it engages the stem 53 which shifts the valve 47 to the position illustrated in Fig. 9, thereby reestablishing communication between the supply of compressed air and the interior of the cylinder 36, it being understood from the foregoing that so long as the supply of air to the port 44 is maintained open, the piston 37 will continue to reciprocate and produce the jarring action desired.

In the operation of jarring the mold for the purpose above stated, the part to which the pattern is secured and the flask 41, are required to be free for up and down movement, relative to the pattern-carrier 25, and to guide the part carrying the pattern we provide on the plate 34 depending pins 55, preferably four in number, arranged at opposite sides of this plate, these pins projecting through openings 56 in the section 27 of the pattern-carrier, whereby the plates 32 and 34 are prevented from shifting on the piston 37 during the jarring operation.

In the operation of the machine, after the jarring of the mold has been completed, the pattern-carrier is swung from the position represented in Fig. 3 to the right in said figure, to the position represented in Fig. 4 to deliver the mold upon the flask-receiving means 29. Before this can be done, however, it is necessary to secure the parts which carry the pattern, to the pattern-carrier, a description of the means which we prefer to employ for this purpose being as follows:

Located at opposite sides of the pattern-carrier at its section 27 are reciprocable bars 57 which slide in bearings 58 secured to, and depending from, the pattern-carrier-section 27, these bars being provided on their inner faces with blocks 59 which are adapted to be moved into and out of recesses 60 provided in the pins 55, these recesses being formed preferably by cutting away the lower ends of the pins, as represented at 61, and fitting washers 62 thereon below the said cut-away portions. The washers are held in place by means of sleeves 63 screwing upon the lower threaded reduced ends of the pins and are held against turning by cotter pins 65 passing through slots 66 in the sleeves and through the threaded ends 64 of the pins. It will be understood from the foregoing description that when the bars 57 are shifted to a position in which the blocks 59 enter the recesses 60 in the pins 55, the plates 32 and 34 and the parts carried thereby will be locked to the pattern-carrier but when the bars 57 are shifted to a position in which the blocks 59 are withdrawn from these recesses, the plates 32 and 34 will be free to be raised and lowered for the purpose hereinbefore described, without disturbing the position of the pattern-carrier.

In the particular constructions of the machines illustrated the locking mechanism just described is operated automatically to withdraw the blocks 59 from the recesses 60 upon turning the pattern-carrier to the position illustrated in Fig. 1, and to project these blocks 59 into said recesses upon the act of turning the pattern-carrier from the ramming position (Fig. 1) to the "drawing" position (Fig. 4), a description of the means provided for this purpose in the machine of Figs. 1 to 12 inclusive being as follows:

Journaled at opposite sides of the pattern-carrier 25 on its outer sides, at trunnions 65 secured to the pattern-carrier, are levers 66, these levers being journaled between their ends on said trunnions and pivotally connected at their lower ends with the adjacent ends of the bars 57, through the medium of rollers 67 on the bars 57 extending into slots 67ª in the lower ends of the levers 66, said levers carrying at their upper ends rollers 68 which oppose cams 69 provided on the upper ends of the standards 22. The faces of the cams 69 which the rollers 68 oppose when the pattern-carrier is in the position illustrated in Fig. 1, are substantially vertical, as represented at 70, and thus during the initial turning movement of the pattern-carrier from the position represented in Fig. 1 to the position represented in Fig. 4, the levers 66 will be rocked on their pivots 65 in anti-clockwise direction thereby shifting the bars 57 to the right in Fig. 1 and carrying the blocks 59 into the recesses 60 in the pins 55, the remaining portion of the cams 69 against which the rollers 68 travel during the remainder of the movement of the pattern-carrier to the position represented in Fig. 4, being so constructed that the levers 66 will be maintained in a position relative to the pattern-carrier, for holding the blocks 59 in the recesses 60.

In the particular construction of machine illustrated the pattern-carrier is operated to swing it from the position illustrated in Fig. 1 to the position illustrated in Fig. 4, by fluid-pressure means, a description of which is as follows:

Located between the standards 22 and pivotally connected therewith, through the medium of trunnions 71 journaled in bosses 72 on the inner faces of the standards 22, is a cylinder 73 containing a piston 74 carrying a piston-rod 75 pivotally connected, as indicated at 76, to crank-arms 77 rigid with pattern-carrier 25, the cylinder 73 being provided with an exhaust port at its lower end communicating with a reversely bent exhaust pipe 78, and with an inlet port (not shown) at its upper end connected with a pipe 79, whereby pressure entering the upper end of the cylinder through the pipe 79 will force the piston 74 downwardly, thereby turning the pattern-carrier on its pivot to the right in Fig. 1 throughout a portion of its movement to the position represented in Fig. 4, the remainder of this movement being controlled by exhausting the pressure in the cylinder 73 above the piston, as will be hereinafter fully explained.

The flask-receiving means 29 are adapted to receive the flask upon turning the pattern-carrier to the position represented in Fig. 4 and to lower the flask with the mold formed therein, away from the pattern to "draw" the pattern, this operation being performed through the medium of fluid-pressure. To this end we provide a cylinder 80 secured to the bed-plate 20 and containing a piston 81 which is provided at its upper end with a head 82 carrying a depending bar 83 which slides in a recess 84 in a bracket 85 secured to the cylinder 80, for preventing the piston 81 from rotating axially. The head 82 carries flask-rests upon which the flask, at its bottom-board represented at 86, is seated in the mold-delivering position. These flask rests may be of any desirable construction, those illustrated being of the form shown in U. S. Letters Patent No. 1102606, issued July 7, 1914, and therefore need not be particularly described. It will suffice to say that at each side of the head 82 are provided vertically adjustable posts 87 each of which carries a head 88 provided with feet 89 pivotally connected thereto at 90, these feet being normally held upwardly by springs, not shown, which compress when the feet 89 are forced downwardly by engagement of the bottom-board 86 therewith in the final movement of the pattern-carrier to the position illustrated in Fig. 4, these feet being independently adjustable to accommodate themselves to non-uniformities in the bottom-board 86 and adapted to be clamped in the position to which they are moved when contacted with by the bottom-board, by means of mechanism controlled through the medium of levers 91 and 92.

The piston 81 is hollow and contains an inner tubular section 93 which communicates with the lower end of the cylinder 80 through the medium of an opening 94$^a$, the fluid-pressure for raising the piston 81 being introduced into the tubular member 93 through an inlet pipe 94 from which it flows through the opening 94$^a$ into the bottom of the cylinder, the exhausting of the cylinder 80 to permit the piston 81 to lower being effected through the section 93 and pipe 94, as hereinafter described. Secured in the bottom of the cylinder 80 and extending loosely through the opening 94$^a$ and into the tubular member 93 is a stem 95 provided at its upper end with a shouldered head 96, a coiled spring 97 surrounding the upper end of the stem 95 in the member 93, being located between the head 96 and the upper surface of the bottom of the piston 81. This spring is so arranged that it becomes compressed in the final upward movement of the piston 81 serving to initially start the piston 81 downwardly upon opening the exhaust to the cylinder 80, thereby reducing to the minimum rebounding of the piston 81. It is preferred that a buffer-spring 81$^a$ be provided on the stem 95 to cushion the piston 81 in its downward movement.

A convenient system of piping for the fluid-pressure employed for actuating the jarring mechanism, the mechanism for turning the pattern-carrier and the "pattern-drawing" mechanism, is illustrated in the drawings, a description of which is as follows:

The pipe which is provided for connection with the fluid-pressure supply, (not shown) as, for example, a supply of compressed air, is represented at 98. Opening into the pipe 98 is a pipe 99 which contains a hand-operated valve 100 and communicates with the port 44 of the cylinder 43. At a point above the pipe 99 the pipe 98 is connected with two branches 101 and 102, the branch 101 being connected with a two-way valve 103 and the branch 102 connected with a two-way valve 104, the pipe 94 which connects with the piston 81, as hereinbefore described, communicating with the valve 103, and the pipe 79 which opens into the cylinder 73 communicating with the valve 104. It will be understood from the foregoing that when the valve 103 is turned to one position it will permit fluid-pressure to enter the cylinder 80 and force the piston 81 and the parts carried thereby upwardly, and when moved to the other position will open this cylinder, through the same pipe, to exhaust, permitting the piston 81 and the parts carried thereby to descend, the speed at which the piston descends being regulated by the speed of exhaust at the valve 103. Furthermore, it will be understood that when the valve 104 is moved to one position fluid-pressure will enter the cylinder 73 above the piston 74, thereby forcing the latter downwardly and turning the pattern-carrier throughout a portion of its movement from the position represented in Fig. 3 to the position represented in Fig. 4, the remainder of the movement of the pattern-carrier to the position represented in Fig. 4 being accomplished by moving the valve 104 to another position to vent the cylinder 73 through this valve, the speed at which the pattern-carrier concludes its movement to the "pattern-drawing" position being controlled by the speed of exhaust through the valve 104.

A general description of the operation of the machine is as follows:

The normal positions of the parts of the machine are those illustrated in Figs. 1, 2 and 3, in which position the pattern-carrier rests upon the uprights 28 and the blocks 59 are withdrawn from the recesses 60. To make a mold the operator applies the flask 41 to the plate 32 (33) filling the flask with sand and ramming the same in accordance with common practice. Air is then admitted to the pipe 99 by opening the valve 100 which causes the piston 37 and the parts carried thereby to be repeatedly lifted and bodily dropped in the manner hereinbefore described to compact the sand in the flask, each time the piston 37 rises, the projection 53ª lifting the bar 50, and consequently the valve-stem 53 which shifts the valve 47 to exhaust position, and each time the piston 37 drops to final position, forcing the valve 47 to inlet position (Fig. 9). As soon as the flask has been rammed to the desired degree the sand is struck off and the bottom-board 86 laid across the top of the flask, and clamps of any suitable form such as, for example, those represented at 105, then applied to fasten over the bottom-board and extensions 34ª on the plate 34 for securing these parts, the plate 32 and the flask 41 together. The operator then turns the valve 104 to admit fluid-pressure to the cylinder 73 for turning the pattern-carrier from the position represented in Fig. 3 toward the position represented in Fig. 4. After the piston 74 has reached the end of its downward stroke, the operator turns the valve 104 to permit the pressure introduced into the cylinder 73, as stated, to exhaust therefrom, thus permitting the pattern-carrier to finish its turning movement and finally seating at its projections 30 against the stop-devices 31 (Fig. 4). The operator then turns the valve 103 to admit fluid-pressure to the bottom of the cylinder 80 which forces the piston 81 and the flask and rests carried thereby, upwardly to a position in which the feet 89 contact with the bottom-board 86 (Fig. 4), whereupon by operating the levers 91 the feet 89 are set. The operator then removes the clamps 105 and the mold is then ready to be lowered away from the pattern 33, this being accomplished by turning the valve 103 to a position in which the fluid introduced into the cylinder 80 to lift the piston 81, will exhaust through the pipe 94 and the valve 103. The direction of movement of the piston 81 being at right angles to the plane in which the pattern 33 is held by the pattern-carrier, the mold is separated from the pattern by a straight-line draw, thereby permitting molds to be accurately made from deep patterns having comparatively slight draft.

As hereinbefore explained, as soon as the pattern-carrier 25 starts to turn, upon introducing pressure into the cylinder 73, from the position illustrated in Fig. 1, the bars 57 are shifted to the right in Fig. 1, thereby locking the plates 32 and 34 to the pattern-carrier.

To return the parts of the machine to normal position to re-position them for making another mold, the operator again actuates the valve 104 to admit pressure to the top of the cylinder 73 which turns the pattern-carrier from the position illustrated in Fig. 4 toward the position illustrated in Fig. 1, the conclusion of the movement of the pattern-carrier to the position represented in Fig. 1 being effected by exhausting the cylinder 73 of the pressure introduced into it to force the piston 74 downwardly, this being effected by manipulating the valve 104. In the final movement of the pattern-carrier to the position illustrated in Fig. 1, the ends of the levers 66 adjacent to the pivots 67 strike the standards 22 and force the bars 57 to the position represented in Fig. 1 wherein the blocks 59 are withdrawn from the recesses 60 thus disconnecting the plates 32 and 34 from the pattern-carrier in order that the mold to be formed thereon may be jarred as hereinbefore described.

It is preferred that the connection of the piston-rod 75 with the cranks 77 be at such a point that when the carrier 25 is swung from ramming-position to the "drawing-position" with the mold thereon, and from "drawing-position" to ramming-position with the mold removed, the center of gravity of the carrier with the parts carried thereby, will extend a slight distance over the dead-center line of the piston 74 before the piston reaches the end of its inward stroke, whereby the carrier concludes its movement to drawing or ramming-position, as the case may be, by gravity, restrained by the speed of the exhaust from the cylinder 73; and to permit this action with different heights of flasks we make the connection 76 adjustable, the adjustment in the particular construction illustrated being effected by providing a plurality of openings 77ª in each crank, into either of which the pin 76 may be adjusted.

The machine illustrated in Figs. 13, 14 and 15 is the same in construction and presents the same mode of operation, as the machine of the preceding figures, excepting as to the construction of the means for automatically operating the bars 57 for the purpose hereinbefore described. Instead of providing the cams 69 and levers 66, as explained in the preceding figures, the bars 57 coöperate at the rollers 67 with brackets 107 secured to the standards 22 and provided with upturned flanges 108 spaced from the body portions of the brackets and affording upwardly opening recesses 109. The parts described are so arranged that during the conclusion of the movement of the pattern-carrier 25 to the position represented in Fig. 13, namely, ramming-position, and a position corresponding to the position of the parts in Fig. 1, the rollers 67 will strike against the body portions of the brackets 107 and force the bars 57 to the left in, and to the position shown in, Fig. 13, and when the pattern-carrier is turned, through the medium of the piston and cylinder mechanism 73 and 74, to the right in Fig. 13 to "pattern-drawing" position, the rollers 67 will strike the projections 108 and shift the bars 57 to the right in Fig. 13 and cause the blocks 59 to enter the recesses 60, as illustrated in Fig. 14, for the purpose hereinbefore explained.

While we have illustrated and described certain particular constructions or forms in which our invention may be embodied, we do not wish to be understood as intending to limit it thereto, as the same may be variously modified and altered without departing from the spirit of our invention, it being our intention to claim our invention as fully and completely as the prior state of the art will permit.

What we claim as new and desire to secure by Letters Patent is:

1. In a molding machine, the combination of an invertible pattern-carrier, jarring mechanism located at the ramming side of the machine and operating through an opening in said carrier, depending recessed members operatively connected with the pattern and movable in guide-openings in said carrier for guiding the pattern during the jarring operation, and shiftable bars on said carrier provided with means adapted to enter said recesses upon shifting said bars, to releasably secure the pattern to said carrier.

2. In a molding machine, the combination of a support, an invertible pattern-carrier mounted thereon, a fluid-pressure-operated flask-receiving mechanism at the drawing-side of the machine, including a cylinder, a member reciprocable in said cylinder and having a flask-receiving part, said member being adapted to be raised to position said part to receive the flask, by introduction of fluid pressure into said cylinder, and a buffer-spring in position to be engaged by said member in the descent of the latter.

3. In a molding machine, the combination of a support, a pattern-carrier marginally hinged to said support and movable on said hinge from ramming position through substantially 180° to inverted, drawing, position, a cylinder at the drawing-side of the machine, a member reciprocable in said cylinder and having a flask-receiving part adapted to receive the flash when the pattern carrier is in drawing position, means for supporting the carrier in inverted position, and guide means for preventing said member from shifting axially.

4. In a molding machine, the combination of a support, a pattern-carrier marginally hinged to said support and movable on said hinge from ramming position through substantially 180° to inverted, drawing, position, a cylinder at the drawing-side of the machine, a member reciprocable in said cylinder and having a flask-receiving part adapted to receive the flask when the carrier is in drawing position, means for supporting the carrier in inverted position, relatively movable members slidably engaging each other and arranged eccentric of said first-named member on the latter and a stationary part of the machine for preventing said first-named member from axially rotating.

5. In a molding machine, the combination of a support, a pattern carrier marginally hinged to said support and movable on said hinge from ramming position at one side of said support through substantially 180° to inverted, drawing, position at the opposite side of said support, means for supporting said carrier in drawing position, a vertically-movable flask-receiving device adapted to receive the flask when the pattern carrier is in drawing position, and means for moving said carrier on its hinge from ramming position to drawing position, comprising a crank-arm connected with said carrier and fluid-pressure-operated piston and cylinder mechanism engaging said crank-arm for operating the latter, the cylinder of said mechanism being oscillatorily supported between its ends on said support to extend generally in an upward direction between the ramming and drawing positions of the carrier.

6. In a molding machine, the combination of a support, a pattern-carrier marginally hinged to said support and movable on said hinge from ramming position through substantially 180° to inverted, drawing, position, means for supporting said carrier in drawing position, a vertically-movable flask-receiving device adapted to receive the flask when the pattern-carrier is in drawing position, and means for moving said carrier on its hinge from ramming position to drawing position, comprising a crank-arm connected with said carrier, fluid pressure-operated piston and cylinder mechanism and means adapting said mechanism to be connected with said crank-arm at any one of a number of points thereon to compensate for changes in condition for insuring the swinging of the carrier by said mechanism beyond dead center.

7. In a molding machine, the combination of a support, a pattern-carrier marginally hinged to said support, means for supporting said carrier in drawing-position, a vertically movable flask-receiving device adapted to receive the flask when the pattern-carrier is in drawing-position, a crank-arm connected with said carrier, a cylinder, a piston therein, a piston-rod connected with said piston, and means for connecting said rod at any one of different points on said crank circumferentially of the axis upon which said carrier turns to compensate for changes in condition for insuring the swinging of the carrier by said piston beyond dead center, and means for controlling the introduction of fluid-pressure into said cylinder and the exhaust therefrom.

8. In a molding machine, the combination of an invertible pattern-carrier containing openings, a pattern-plate provided with depending members which guidingly fit in said openings, and are positioned to extend below the upper surface of said carrier when the latter is in ramming position and presenting laterally-extending shoulders, said members being movable with said plate in said openings, and shiftable members on said carrier provided with means adapted to interlock with said shoulders and releasably lock said pattern-plate to said carrier.

9. In a molding machine, the combination of an invertible pattern-carrier containing openings, a pattern-plate provided with depending members which guidingly fit in said openings, and are positioned to extend below the upper surface of said carrier when the latter is in ramming position and presenting laterally-extending shoulders, said shoulders being movable with said plate in said openings, and shiftable members on said carrier provided with blocks adapted to interlock with said shoulders and releasably lock said pattern-plate to said carrier.

10. In a molding machine, the combination of a frame, an invertible pattern-carrier on said frame, a cam on said frame, a shiftable member on said carrier, means controlled by the shifting of said member for locking the pattern to said carrier, and actuating means for said shiftable member comprising a lever fulcrumed between its ends on said carrier and engaging at one end said shiftable member and riding at its opposite end on said cam.

11. In a molding machine, the combination of an invertible pattern-carrier, a pattern-plate, jarring mechanism located at the ramming side of the machine, guide-pins operatively connected with said pattern-plate and movable in guide-openings in said carrier, and means on said carrier engaging said guide-pins for releasably securing the pattern-plate to said carrier.

12. In a molding machine, the combination of an invertible pattern-carrier, a pattern-plate, jarring mechanism located at the ramming side of the machine, guide-pins operatively connected with said pattern-plate and movable in guide-openings in said carrier, and means on said carrier operating automatically upon the act of inverting the pattern-carrier, to engage said guide-pins and releasably secure the pattern-plate to said carrier.

EDWARD A. PRIDMORE.
WM. W. MILLER.

In presence of—
D. C. SNOW,
C. G. WALSH.

Copies of this patent may be obtained for five cents each, by addressing the "Commissioner of Patents, Washington, D. C."